United States Patent [19]

Clorfeine

[11] 4,050,071
[45] Sept. 20, 1977

[54] BI-STATIC RADAR SPEED SENSOR

[75] Inventor: Alvin Seymour Clorfeine, Adelphi, Md.

[73] Assignee: RCA Corporation, New York, N.Y.

[21] Appl. No.: 687,142

[22] Filed: May 17, 1976

[51] Int. Cl.² .............................................. G01S 9/42
[52] U.S. Cl. .................................................... 343/8
[58] Field of Search ............................................ 343/8

[56] References Cited
U.S. PATENT DOCUMENTS 3,833,906  9/1974  Augustine ............................. 343/8 X
3,859,660  1/1975  Augustine et al. ................... 343/8 X Primary Examiner—T.H. Tubbesing
Attorney, Agent, or Firm—H. Christoffersen; Joseph D. Lazar; Raymond E. Smiley

[57] ABSTRACT

A doppler speed sensor for a ground vehicle wherein errors due to perpendicular velocity and vehicle tilt relative to the ground surface are substantially eliminated by utilization of a first receiving antenna having a radiation pattern disposed facing forwardly and covering a portion of the ground surface, and a second receiving antenna having a radiation pattern disposed facing rearwardly and overlapping the first antenna radiation pattern on the ground surface portion.

6 Claims, 3 Drawing Figures

BI-STATIC RADAR SPEED SENSOR

BACKGROUND OF THE INVENTION

1. Field of the Invention

The present invention relates to Doppler speed sensors.

2. Description of the Prior Art

Doppler radar speed sensors for ground vehicles are typically mounted on the underside of the vehicle such that a probe signal is radiated towards the ground surface at a predetermined angle of incidence. A portion of the probe signal is reflected retrodirectively from the ground surface back in the direction from which the probe signal came. Such retrodirectively reflected portion of the probe signal is referred to in the art as "backscatter." The remainder of the probe signal is either absorbed by the ground surface or reflected, other than retrodirectively, at various angles, and in particular, at an angle of reflection equal to the angle of incidence but on the opposite side of the normal to the ground surface. The amount of backscatter from a given ground surface, is affected by the parameters and radiation pattern of the probe signal, and by the characteristics of the ground surface. For example, the wavelength, power and polarization of the radar probe, the area of ground surface illuminated by the probe signal, the angle of incidence of the probe signal, and the conductivity, permittivity and roughness of the ground surface all affect backscatter from the ground surface.

The frequency of the backscatter is Doppler shifted from the frequency of the probe signal ($f_o$) in accordance with the speed of relative motion between the vehicle and the ground surface. The backscatter is received by the radar, and the Doppler frequency shift thereof is determined to derive the relative speed.

It is desirable that the output signal of a vehicular Doppler speed sensor manifest only the forward velocity of the vehicle, that is, the value of the component of velocity in a forward direction parallel to the longitudinal axis of the vehicle and parallel to the ground surface (hereinafter termed "parallel velocity"). However, the Doppler speed sensor output signal manifests the magnitude of the relative velocity, and, the Doppler shift of the backscatter typically includes components attributable to relative motion between the sensor and the ground surface in directions perpendicular (normal) to the ground surface, in addition to components indicative of the parallel velocity. Such perpendicular motion may be caused by, for example, bounce of the vehicle. Thus, Doppler shift due to components of velocity in a direction perpendicular to the ground surface (hereinafter termed "perpendicular velocity") introduce an error into the system. A similar error is caused in prior plural antenna systems, described below, by non-parallel alignment ("tilt") of the vehicle underside with respect to the ground surface.

The sensitivity of the radar to perpendicular velocity, and hence the error therefrom, increases as the angle of probe incidence approaches the normal to the ground surface. For example, the prior art systems typically operate with angle of incidence of 40° with respect to the ground surface. If an angle of incidence of 80° with respect to the ground surface were utilized, a perpendicular velocity of 1/20 (5%) of the parallel velocity will result in an error of 30 percent. Additional errors due to vehicle tilt in plural antenna systems also increase as the angle of incidence approaches normal.

A dilemma arises in vehicular speed sensors due to the increase in errors due to perpendicular velocity and vehicle tilt as the angle of incidence approaches normal, in that the amount of backscatter generated by a probe signal decreases as the angle of incidence moves away from normal to the ground surface. In automotive speed sensors, the characteristics of many road surfaces, particularly when wet, tend to generate very little backscatter, requiring that an angle of incidence relatively close to normal be used to generate adequate amounts of backscatter. Thus, the requirement of a low angle of incidence to avoid errors due to vehicle vertical velocity is in conflict with the requirement of a high angle of incidence for production of backscatter.

In prior art systems, attempts have been made to increase backscatter without increasing the angle of incidence towards normal by, for example, placing the Doppler sensor directly following a wheel, the wheel serving persumably to clear the road surface of water and mud. Such systems are disadvantageous in that the splash of water and mud not only may damage the equipment but also affects the transmission property of the signals.

Other prior art systems, utilizing a plurality of transmitting and receiving antennas have been proposed. For example, a so-called "Janus" system, is described in an article entitled "Vehicular Radar Speedometer" by Hyltin, Fuchser, Tyson and Regueiro presented before the Society of Automotive Engineers at the International Automotive Engineering Congress and Exposition, Jan. 8-12, 1973. A similar system is described in U.S. Pat. No. 3,833,906 issued Sept. 3, 1974, to C. F. Augustine. The Janus-type systems comprise two "back-to-back" antennas, respectively facing forward and rearward with non-overlapping radiation patterns, each antenna serving to provide transmitting and receiving functions. The respective backscatter signal portions received by the antennas are added and subtracted to derive sum and difference signals, from which the Doppler speed is determined. The Janus system tends to decrease errors due to perpendicular velocity and vehicle tilt.

However, the back-to-back Janus configuration of the antennas creates an upper limit on how closely the angles of incidence can approach normal. For example, the angle of incidence in such Janus systems is limited in that the radiation patterns of the respective antennas have finite widths and any overlap of the respective radiation patterns typically causes interference and errors. In addition, the Janus configuration tends to cause non-specular ground radiation from one antenna to be received by the other, causing further errors. Moreover, the processing circuitry of such prior art systems, typically either operate at the relatively low ampltiude levels of backscatter signals, or include relatively complex amplification means.

SUMMARY OF THE INVENTION

The present invention is directed to a speed sensor wherein the signals reflected from the ground surface are received by at least two antennas. The first antenna has a radiation pattern disposed facing forwardly at a predetermined angle with respect to the ground surface and covering a portion of the ground surface. The second antenna has a radiation pattern disposed facing rearwardly at a second predetermined angle with respect to the ground surface and overlapping the first antenna radiation pattern on the ground surface portion.

A probe signal illuminates the ground surface portion. The signals received by the respective antennas are utilized to obtain a signal representative of the speed of the vehicle in the direction of forward motion.

DESCRIPTION OF THE PREFERRED EMBODIMENT

Figure 1:
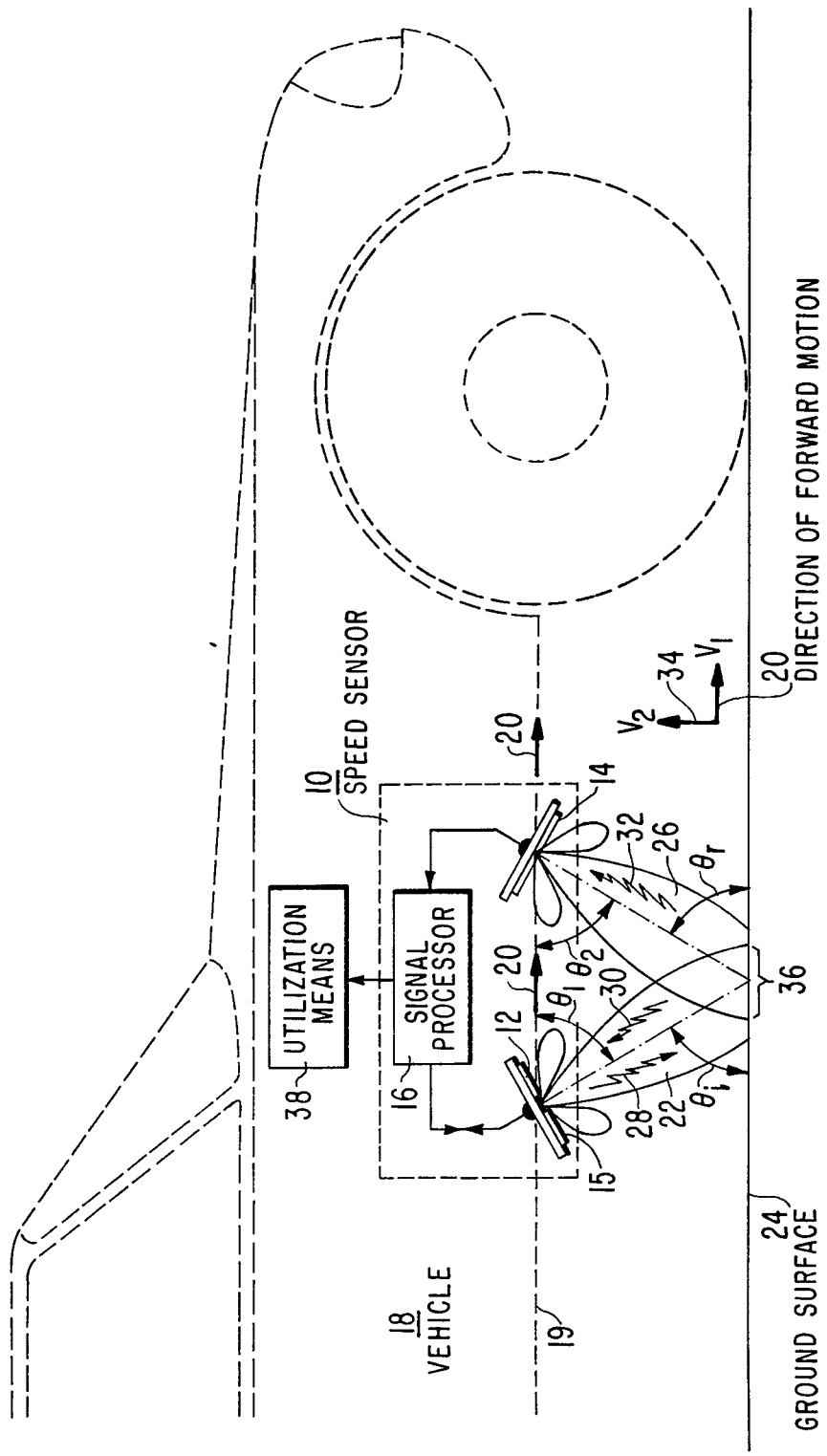
FIG. 1 is a schematic side view of a vehicle mounted speed sensor in accordance with the present invention.

Referring to FIG. 1, the relationship of a vehicular speed sensor 10 in accordance with the present invention to a cooperating vehicle 18 and a ground surface 24 is shown in schematic form. Speed sensor 10, suitably affixed to vehicle 18, comprises first and second receiving antennas 12 and 14, a transmitting antenna 15 and a suitable signal processor 16. Antennas 12, 14 and 15 are coupled to signal processor 16, which is, in turn, coupled to suitable utilization means 38, such as a dashboard read-out or indicator. Antennas 12, 14 and 15 are suitably printed circuit corporate feed antennae such as described in U.S. Pat. No. 3,587,110 issued June 22, 1971 to O. M. Woodward, or conventional horn type antennas. An embodiment of signal processor 16 will be more fully described in conjunction with FIG. 3.

Vehicle 18 moves on ground surface 24 in a given direction of forward motion indicated by vectors 20. It is assumed in the description immediately following that the underside 19 of vehicle 18 is parallel to ground surface 24, and hence also parallel to direction of forward motion 20. Transmitting antenna 15 is fixed to the underside 19 of vehicle 18 such that the radiation pattern 22 from antenna 15 is directed forwardly and downwardly towards ground surface 24 at a predetermined angle $\theta_1$ with respect to underside 19 of vehicle 18, (angle $\theta_1$ with respect to ground surface 24) and irradiates a portion 36 of ground surface 24.

First receiving antenna 12 is similarly fixed to underside 19 such that the radiation pattern associated therewith substantially overlaps radiation pattern 22 of transmitting antenna 15, such that antenna 12 receives the substantially same Doppler shifted backscatter as would be received if antenna 12 was coincident with antenna 15. Thus, antennas 12 and 15 are effectively coincident. Accordingly, radiation pattern 22 will hereinafter be referred to as being associated with both antennas 12 and 15.

If printed circuit corporate feed antennas are used, antennas 12 and 15 may be suitably arranged on a common substrate such that the respective radiation patterns overlap. It should be noted that the relative positioning of antennas 12 and 15 as shown in FIG. 1, is chosen for ease of illustration. In practice, antennas 12 and 15 are typically positioned along a line parallel to the transverse axis of vehicle 18, such that the perpendicular displacements of the respective antennas 12 and 15 from ground surface 24 are substantially identical.

Second receiving antenna 14 is affixed to the underside 19 such that the radiation pattern 26 therefrom is directed rearwardly, parallel to the longitudinal axis of vehicle 18 and downwardly toward ground surface 24 at an angle $\theta_2$ with respect to the underside 19 (angle $\theta_r$, with respect to ground surface 24), and converges upon and overlaps radiation pattern 22 on ground surface portion 36. $\theta_2$ is preferably substantially equal to $\theta_1$. It should be noted that when the underside of vehicle 18 is parallel to ground surface 24, $\theta_i = \theta_1$ and $\theta_r = \theta_2$.

It should be appreciated that the shapes of radiation patterns 22 and 26 as shown in FIG. 1 are merely graphic representations of the actual shapes of such radiation patterns and are chosen for ease of illustration.

In the operation of speed sensor 10, a probe signal 28 is transmitted from antenna 15 in accordance with the radiation pattern 22. A portion 30 of probe signal 28 is backscattered from ground surface 24 back to antenna 12. A second portion 32 of interrogation signal 28 is reflected from ground surface 24 at such an angle as to be received by second receiving antenna 14. Reflected signal portion 32 (hereinafter reflected signal 32) is typically of greater amplitude than backscatter 30.

As vehicle 18 moves in direction 20, parallel to the ground surface, there may be a component of motion in a direction, indicated by vector 34, perpendicular to ground surface 24, due to, for example, a "bounce" of vehicle 18 as it goes over a bump in ground surface 24. Thus, when vehicle 18 bounces, antennas 12 and 15 will move in both perpendicular and parallel directions with respect to ground surface portion 36. Accordingly, the frequency of backscatter 30 is Doppler shifted by an amount $f_{11}$ from frequency $f_o$ of probe signal 28, the Doppler shift $f_{11}$ having components due to the relative motion between antenna 15 and ground surface portion 36 and the relative motion between ground surface portion 36 and antenna 12. Antennas 12 and 15, however, are, in effect, coincident as described above and the frequency shift $f_{11}$ may be represented mathematically as $$f_{11} = 2[(1/\lambda)(V_1 \cos \theta_i + V_2 \sin \theta_i)] \quad (1)$$

where $\lambda$ is the wavelength of probe signal 28, $V_1$ and $V_2$ are, respectively, the magnitudes of the parallel and perpendicular velocities of vehicle 18 with respect to ground surface 24 and $\theta_i$ is, as noted above, the angle of incidence of probe 28 with respect to ground surface 24.

In accordance with the present invention, antenna 14 receives reflected signal 32 which is utilized by signal processor 16 to cancel out the Doppler shift due to perpendicular components of velocity ($V_2$) manifested in the Doppler shift of backscatter 30.

A Doppler shift $f_{12}$ manifested by reflected signal 32, has components due to the relative motion between antenna 15 and ground surface portion 36 and, in addition, components due to the relative motion between ground surface portion 36 and antenna 14. It should be noted, however, that antennas 15 and 14 are fixed with respect to each other on underside 19. Thus, while antenna 15 is advancing, in parallel direction 20, towards ground surface portion 36 during the travel of probe signal 28 to ground surface portion 36, antenna 14 is receding from ground surface portion 36 at an identical rate during the travel of reflected signal 32. Thus, the Doppler shift frequency components due to the relative motions in parallel direction 20 correspondingly increase and decrease the frequency of reflected signal 32. Conversely, antennas 15 and 14 move in the same perpendicular direction along the direction 34 with respect to ground portion 36 during the respective travels of probe 28 and reflected signal 32 and accordingly, the Doppler shift components due to the perpendicular velocities are additive. Accordingly, the Doppler shift $f_{12}$ manifested by reflected signal 32 may be expressed mathematically as:

$$f_{12} = 1/\lambda \, [V_1 \cos \theta_i + V_2 \sin \theta_i - V_1 \cos \theta_r + V_2 \sin \theta_r] \quad (2)$$

Accordingly, when $\theta_1$ and $\theta_2$ are substantially equal, and underside 19 is parallel to ground surface 24 such that $\theta_i = \theta_r$, the Doppler shift due to the relative perpendicular motion between antenna 12 and ground surface portion 36 is cancelled by the Doppler shift due to the relative perpendicular motion between surface portion 36 and antenna 14. Thereby equation (2) reduces to:

$$f_{12} = 2/\lambda \, [V_2 \sin \theta_i] \quad (3)$$

Thus, assuming underside 19 is parallel to ground surface 24, there is no net Doppler shift of the frequency of reflected signal 32 due to parallel velocities. Accordingly antenna 14 serves to compensate for perpendicular velocity errors due to movement of antenna 12.

Signal processor 16, as will be described in conjunction with FIG. 3 in effect, subtracts the Doppler shift frequency of reflected signal 32 from the resultant Doppler shift frequency of backscatter 30 to generate a signal representative of the parallel velocity without any errors due to perpendicular velocity effects. Such parallel signal is applied to utilization means 38.

Figure 2:
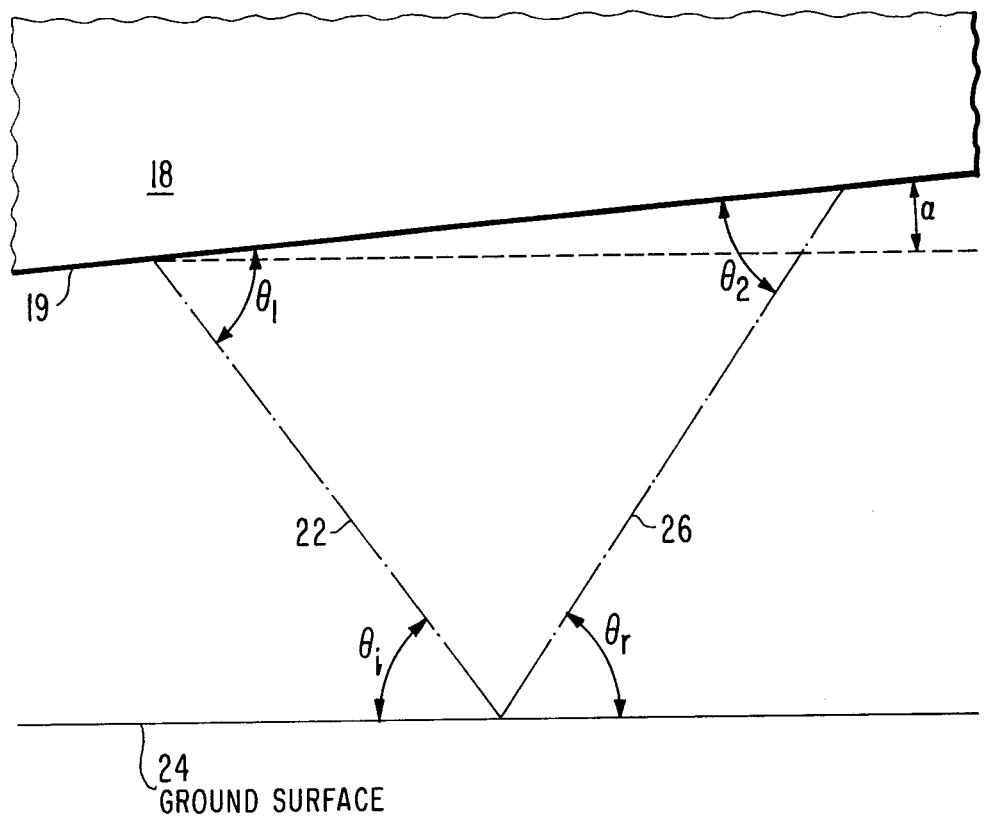
FIG. 2 is a schematic diagram illustrating vehicle tilt.

It should be noted that the above discussion assumes that the underside 19 of vehicle 18 is substantially parallel to ground surface 24, that is, without vehicle tilt. Tilt of vehicle 18 could affect the operation of sensor 10 if the respective perpendicular displacements of the antennas 15 and 14 from ground surface 24 is significantly changed thereby. Tilt can occur about the longitudinal axis of the vehicle, the lateral (transverse) axis of the vehicle, or a skewed axis thereto. Tilt about the longitudinal axis occurring in normal operation of vehicle 18 does not alter the relative incident angles of the respective antennas 15 and 14 and accordingly, typically has no affect on the sensor operation. However, tilt about the transverse axis does affect the relative displacement of the respective antennas (15, 14). Such an effect will now be discussed in conjunction with FIGS. 1 and 2. Referring to FIG. 2, radiation patterns 22 and 26 are represented by their respective centerlines. Vehicle 18 is shown tilted along the vehicle transverse axis by an angle $\alpha$ with respect to ground surface 24, due to, for example, braking, acceleration, or being tilted by a bump in ground surface 24. When vehicle 18 is tilted about the transverse axis by an angle $\alpha$ the effective angle of incidence $\theta_i$ of radiation pattern 22 with respect to ground surface 24 is decreased by $\alpha$, that is:

$$\theta_i = \theta_1 - \alpha \quad (4)$$

Similarly, the effective angle of reflection $\theta_r$ of radiation pattern 26 becomes:

$$\theta_r = \theta_2 + \alpha \quad (5)$$

The respective Doppler shifts $f_{11}$ and $f_{12}$ thus become:

$$f_{11} = 2/\lambda \, [V_1 \cos (\theta_1 - \alpha) + V_2 \sin (\theta_1 - \alpha)] \quad (6)$$

$$f_{12} = V_1/\lambda \, [\cos (\theta_1 - \alpha) - \cos (\theta_2 + \alpha)] + (V_2/\lambda) \, [\sin (\theta_1 - \alpha) + \sin (\theta_2 + \alpha)] \quad (7)$$

Thus, when underside 19 is tilted with respect to ground surface 24, subtraction of $f_{12}$ from $f_{11}$ will not totally cancel the Doppler shift due to perpendicular velocity. However, the uncancelled perpendicular component of Doppler shift is typically so small as to be negligible. For example, where $\theta_1 = \theta_2 = 70°$ and vehicle 18 is parallel to ground surface 24 and the perpendicular velocity $V_2$ is one fifth (0.2) of the parallel velocity $V_1$, the difference frequency, $\Delta f$, between $f_{11}$ and $f_{12}$ is equal to about 0.684 $(V_1/\lambda)$. When such system experiences a 5° tilt, $\Delta f$ is computed to be equal to about 0.669 $(V_1/\lambda)$. Thus, there is only a 2.2% variation due to a 5° tilt about the transverse axis of vehicle 18. Such an error is negligible in the operation of sensor 10.

Figure 3:
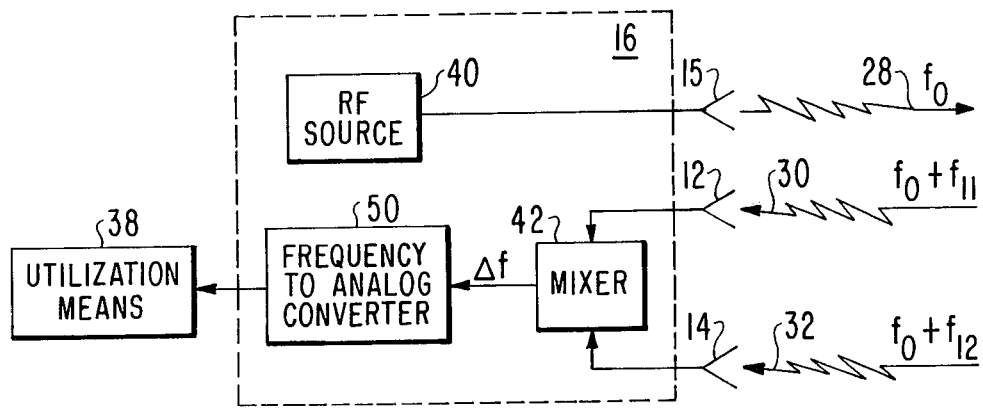
FIG. 3 is a block diagram of one embodiment of a speed sensor in accordance with the present invention.

Referring now to FIG. 3, there is shown a block schematic of a preferred form of a detailed description of signal processor 16. A conventional RF source 40 generates a continuous wave radio frequency (RF) signal having a predetermined frequency $f_0$. Antenna 15 radiates the RF signal as probe signal 28, to illuminate ground surface portion 36 (FIG. 1). Antenna 12 receives backscatter 30 and antenna 14 receives reflected portion 32. The respective frequencies of backscatter 30 and reflected signal 32 may be expressed as $f_0 + f_{11}$ and $f_0 + f_{12}$, where $f_0$ is the frequency of probe 28, $f_{11}$ is the Doppler shift of backscatter 30 and $f_{12}$ is the Doppler shift of reflected signal 32, as explained above. Backscatter 30 and reflected signal 32 are each applied from antennas 12 and 14 to the respective input terminals of a conventional mixer 42. Mixer 42 generates first and second output signals, the first being indicative of the frequency difference between backscatter 30 and reflected signal 32 and the second indicative of the sum of the various input frequencies. Thus, the first output signal of mixer 52 is indicative of the difference frequency $\Delta f$, representative of the Doppler shift due to parallel velocity. It should be noted that the relatively large amplitude reflected signal 32 is sufficient to serve as a local oscillator signal, to mixer 42, and provide a useable output signal from mixer 42. Mixer 42 is coupled, through suitable lowpass filters (not shown) which serve to block or filter out the second "sum frequency" mixer output signal, to a suitable frequency-to-analog converter 50, which translates the difference frequency $\Delta f$ signal into a normalized signal indicative of speed, which normalized signal is in turn used to drive utilization means 38.

It should be appreciated that additional provisions may be desirable to prevent or minimize leakage of the probe signal to mixer 42.

It should further be appreciated that a single antenna and circulator may be utilized to replace separate transmitting antenna 15 and first receiving antenna 12. However, even more care will be required to prevent probe signal 28 from leaking through the circulator and mixer 42.

In summary, the present invention provides a particularly advantageous Doppler radar vehicle speed sensor in that the probe signal angle of incidence may be close to normal (perpendicular) to the ground surface to generate thereby increased backscatter, without substantially degrading the accuracy of the sensor due to increased sensitivity to perpendicular velocity and vehicle tilt, or due to inter-antenna interference.

What is claimed is:

1. In an apparatus, cooperating with a vehicle having forward and rearward portions along a longitudinal axis, for sensing the speed of motion of said vehicle with respect to a ground surface in a forward direction substantially parallel to said longitudinal axis and substantially parallel to said ground surface, said apparatus being of the type including first means for transmitting a probe signal to said ground surface, second means for receiving signals reflected from said ground surface and third means, responsive to signals respectively indicative of said probe signal and said reflected signals for generating a signal indicative of said speed, the improvement wherein:

said second means comprises at least first and second antennas each of said antennas receiving a portion of said reflected signals, said first antenna having a radiation pattern disposed facing forwardly in a direction substantially parallel to said longitudinal axis and downwardly towards said ground surface at a first angle with respect to said ground surface, said first antenna radiation pattern covering a portion of said ground surface; and said second antenna having a radiation pattern disposed facing rearwardly in a direction substantially parallel to said longitudinal axis and downwardly towards said ground surface at a second angle with respect to said ground surface and converging with and said first antenna radiation pattern on said ground surface portion.

2. The apparatus of claim 1 wherein said first means includes means for transmitting said probe signal to said ground surface at a third angle with respect to said ground surface, said third angle being equal to said first angle.

3. The apparatus of claim 2 wherein said first antenna includes means for both radiating said probe signal and receiving said reflected signals.

4. The apparatus of claim 1 wherein said third means comprises, mixer means, responsive to a signal representative of said reflected signal portions received by said first antenna and a signal representative of said reflected signal portions received by said second antenna, for generating a signal indicative of the frequency difference between said first antenna reflected signal portions and said second antenna reflected signal portions.

5. The apparatus of claim 1 wherein said first and second angles are equal.

6. The apparatus of claim 5 wherein said third means comprises, mixer means, responsive to a signal representative of said reflected signal portions received by said first antenna and a signal representative of said reflected signal portions received by said second antenna, for generating a signal indicative of the frequency difference between said first antenna reflected signal portions and said second antenna reflected signal portions.

* * * * *